July 10, 1962  D. E. SCHOTT  3,043,273
OVERSPEED SAFETY DEVICE
Filed Sept. 29, 1960

INVENTOR
Donald E. Schott
BY
Pennie Edmonds Morton Barrows Taylor
ATTORNEYS

United States Patent Office 3,043,273
Patented July 10, 1962

3,043,273
OVERSPEED SAFETY DEVICE
Donald E. Schott, Emerson, N.J., assignor to Thomas C. Wilson, Inc., Long Island City, N.Y., a corporation of New York
Filed Sept. 29, 1960, Ser. No. 59,426
1 Claim. (Cl. 121—34)

This invention relates to pneumatic motors, such as are used in various power-driven tools including hand-held grinders, brushes, etc. More particularly, the invention is concerned with a novel pneumatic motor, which is provided with a safety device built into the rotor and stopping the motor if its rated speed is exceeded. The safety device is simple in construction and reliable in operation and, since it functions only when an excessive motor speed develops, it is not subject to wear during normal motor operation. When the device has operated to stop the motor, the motor cannot be started again until the device has been reset. Accordingly, it is impossible for a careless operator to defeat the purpose of the device.

Pneumatic motors used in power-driven tools are commonly provided with a governor which functions as selected motor speed is approached to restrict the air supply to the motor and thus restrict the motor speed correspondingly. Such governors are effective for their intended purpose so long as they are in good working order but sometimes such governors become inoperative because they are out of adjustment or because they have become jammed by dirt carried into the motor in the compressed air supply. When a governor is out of action, excessive motor speeds may develop with possible injury to property and personnel. It is, therefore, desirable to equip a pneumatic motor with an overspeed safety device which will function to stop the motor when the governor fails to act and the motor speed exceeds the rated speed.

The motor of the invention is provided with a safety device forming part of the motor and serving the desired purpose of insuring that the motor will be operated only at safe speeds. The motor includes the usual cylinder and rotor, the latter being mounted eccentrically within the cylinder and formed with slots containing blades which normally bear at their outer edges against the inner surface of the cylinder and move in and out of the slots as the rotor turns. Cavities are formed in the rotor to intersect respective slots and each cavity contains an element, which is normally inoperative but is movable by centrifugal force to engage the blade in the related slot and hold it against movement out of the slot. The rotor is also provided with means restraining respective elements from movement by centrifugal force below a selected value. In the operation of the new motor, the blades move freely in and out of their slots during the rotation of the rotor at or below rated speed and the elements are restrained against movement. If the rated motor speed is exceeded, centrifugal force causes movement of the elements against the resistance of the restraining the means and the elements engage their associated blades and hold the blades against movement out of their slots. As a result, the motor stops and it cannot be started again until the elements have been moved back to their original positions and brought again under the influence of the restraining means.

For a better understanding of the invention, reference may be made to the accompanying drawings, in which FIG. 1 is a view in longitudinal section of the pneumatic motor of the invention on the line 1—1 of FIG. 2;

Figure 1:
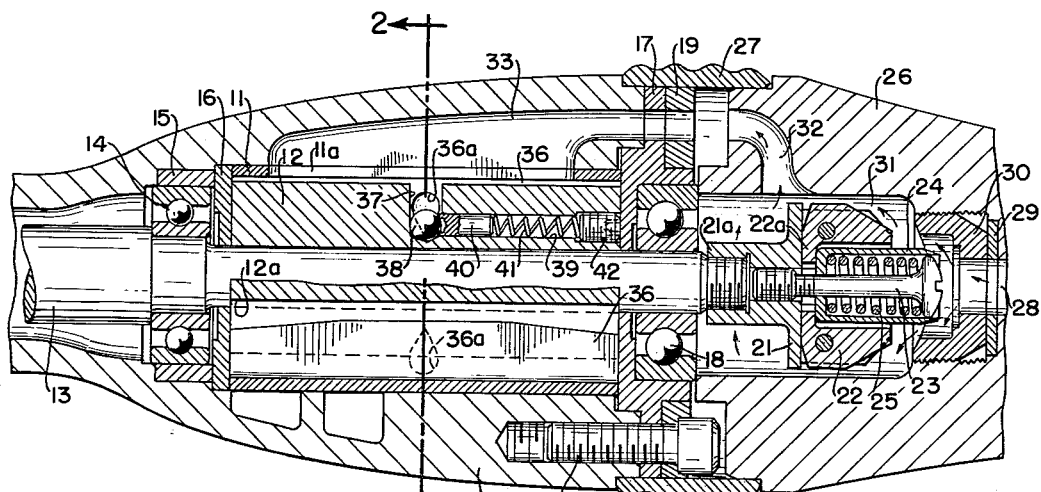

The pneumatic hand-held grinder, of which part is illustrated in FIG. 1, comprises a casing 10 enclosing a pneumatic motor, which includes a cylinder 11 and a rotor 12 within the cylinder and in the form of a sleeve enclosing and keyed to a shaft 13. The shaft extends through the cylinder in eccentric relation thereto and is supported between its ends in an intermediate ball bearing 14 inside a ring 15 disposed within the casing and seated against an internal shoulder. At the rear end of the ring, the shaft is encircled by a front end plate 16 lying between the ring and the forward ends of the cylinder 11 and rotor 12. At the rear ends of the cylinder and rotor, the shaft is encircled by a rear end plate 17 having a central recess, in which is disposed a rear ball bearing 18 for the shaft. Outwardly from the recess, the rear end plate is provided with a flange engaging the end of the casing 10 and a clamp plate 19 lies against the rear face of the flange. A plurality of bolts 20 passing through openings in the clamp plate and the rear end plate enter bores in the casing and hold the assembly of parts in position.

The rear end of the shaft 13 projects beyond the bearing 18 and is threaded into the hub 21a of the body of a governor 21. The body 21 is formed with diammetrical slots and weights 22 are pivotally mounted in respective slots, the weights having ears 22a extending radially inward. A bolt 23 is threaded into the body coaxially with the motor shaft and a valve member 24 of cup form loosely encircles the bolt and is urged inward along the bolt into contact with the ears 22a of the weights 22 by a spring 25 lying within the valve member and bearing at one end against the under side of the head of the bolt and, at the other, against the bottom of the cup.

Figure 2:
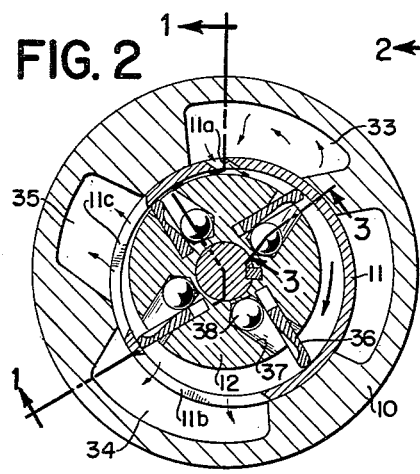
FIG. 2 is a sectional view on the line 2—2 of FIG. 1.
Figure 3:
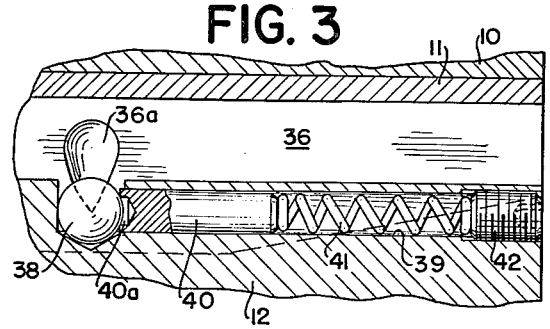
FIG. 3 is a fragmentary longitudinal view on the line 3—3 of FIG. 2.

A hollow handle 26 is secured by bolts (not shown) to the rear end of the motor casing 10 and a fairing ring 27 encircles the adjacent ends of the casing and handle and the rear end plate 17 and the clamping ring 19. The handle has a passage 28 for admission of air under pressure and leads to a washer 29 and a bushing 30 threaded into a bore concentric with the passage. The bushing acts as a valve seat for the valve member 24 and air flowing from passage 28 travels through the washer 29 and through the space between the bushing 30 and the valve member 24 into a chamber 31 containing the governor. A passage 32 leads from the chamber to aligned openings in the clamping ring 19 and the rear end plate 17 and air passing through the openings enters an inlet chamber 33 in the casing 10. The air from chamber 33 enters the cylinder 11 through an elongated air inlet port 11a and flows through the cylinder in a clockwise direction as seen in FIG. 2. The air escapes from the cylinder through outlet ports 11b and 11c into outlet passages 34, 35, respectively, in the casing.

As shown in FIG. 2, the surface of the rotor lies closest to the inner surface of the cylinder near the edge of the port 11c, which is downstream in the direction of rotor travel. The rotor is provided with a plurality of slots 12a extending from end to end inward from its peripheral surface at an angle to radii and the specific rotor shown has four such slots spaced 90° apart. A blade 36 is mounted in each slot and each blade is of a width greater than the greatest distance between the surface of the rotor and the cylinder. A plurality of cavities 37 are formed in the rotor to extend inward from its periphery surface midway between its ends and each cavity intersects one of the slots 12a at an angle. Each cavity contains a locking element 38, which is a ball of a diameter such that the ball has a close fit in the cavity. A plurality of passages 39 formed in the rotor extend inwardly from its rear end parallel to its axis to intersect respective cavities 37. Each passage contains a retainer 40 having the form of a plug provided with a recess 40a at its outer end and a coil spring 41 within each passage bears at one end against the inner end of the plug and, at the other, against a set screw 42 threaded in to the rear end of the passage. Each blade is formed with a depression 36a which lies in alignment with one of the retaining elements 38.

In the operation of the motor, air supplied through the passage 28 in the handle flows through the washer 29, the space between the bushing 30 and the valve member 24, and into the chamber 31. The air travels from the chamber through the passage 32 and through the aligned openings in the clamp ring 19 and the flange of the rear end plate 17 into the chamber 33 in the casing. The air from the chamber flows through the entrance port 11a into the cylinder where the air acts on the blades successively to cause rotation of the rotor. As the rotor rotates, the blades are urged outwardly by centrifugal force so that they remain in contact with the interior of the material throughout their travel. As each blade reaches the port 11b, the air behind the blades escapes from the cylinder through the port into the chamber 34 and air also escapes from the cylinder through the port 11c into the chamber 35. As the blades move close to the port 11b, they are forced inwardly in their slots and they reach their inmost positions between the port 11c and the port 11a.

Under normal conditions of operation, the governor weights 22 are swung outwardly, as the motor speed increases, and their ears 22a move the valve member 24 toward the valve seat provided by bushing 30 and cut down the flow of air to the rotor correspondingly. However, if the governor should become inoperative for any reason, as because of its being out of adjustment or becoming jammed by dirt carried into the motor in the compressed air supply, the overspeed safety device of the invention will function to bring the rotor to a stop.

Figure 4:
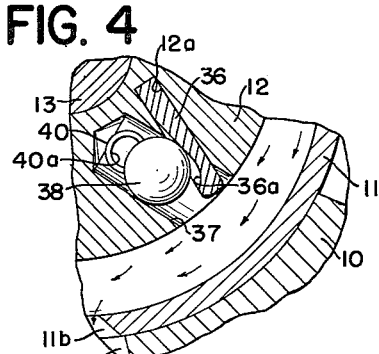
FIGS. 4 and 5 are enlarged fragmentary transverse sectional views showing the safety device in operative and inoperative positions, respectively.
Figure 5:
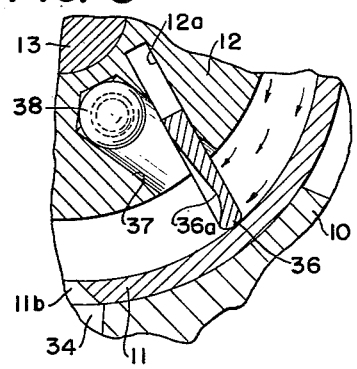

Below the rated speed of the motor, the locking balls 38 are held at the inner ends of their cavities 37 by the retainers 40 pressed against the balls by the springs 41. If the rated motor speed is exceeded, the centrifugal force acting on the balls will be sufficient to free them from the retainers and the balls will then be urged outwardly in their cavities and into contact with the blades 36. The bottom of each depression 36a in a blade is a cam surface which permits its blade to be moved inwardly in its slot by contact with the cylinder, even though the associated ball is being urged into contact with the plate by centrifugal action. However, when a blade has been forced entirely into its slot, the ball will lie in contact with the cam surface and will prevent the outward movement of the blade from the slot by centrifugal force. As a result, the blades will be successively locked in their inward positions in the slots as shown in FIG. 4, and, although the air supply to the cylinder is continued, the air cannot produce rotation of the rotor because all the blades are locked in retracted position in the slots.

The rotor speed, at which the locking elements are released from their retainers and become effective to lock the blades in retracted position, depends on the pressure with which the retainers 40 are forced into contact with the elements. This pressure can be varied by adjusting the position of the set screws 42, which compress the springs 41 acting on the retainers.

When the safety device of the invention has functioned to lock the blades in retracted position, the motor cannot be started again until the blades have been released. This requires that the handle be removed and that the governor and motor be disassembled sufficiently to expose the rotor and permit the balls to be restored to the bottoms of their cavities in position to be engaged by the retainers 40. At the same time, the governor can be restored to operating condition. A motor equipped with the device can thus not be accidentally started again when the device has functioned but must be placed in good working order before it can again be used.

I claim:

In a pneumatic motor, the combination of a casing having inlet and outlet openings, a rotor mounted within the casing with its axis of rotation eccentric to the casing axis and having a plurality of slots open at its periphery, a plurality of cavities in the rotor open to respective related slots, a blade in each slot receivable substantially entirely within the slot and normally having its outer edge in contact with the inner surface of the casing during rotation of the rotor, each blade having a depression in its surface facing the related cavity, the depression having a cam surface, a ball in each cavity movable by centrifugal force to engage the cam surface in the blade in the related slot and hold the blade against movement out of the slot, and means carried by the rotor for restraining respective balls against movement by centrifugal force below a selected value.

References Cited in the file of this patent
UNITED STATES PATENTS
3,002,495   Babb et al. _____ Oct. 3, 1961